United States Patent
Cathers

[11] 3,907,128
[45] Sept. 23, 1975

[54] LEAD EDGE STOP DEVICE
[75] Inventor: William P. Cathers, Allison Park, Pa.
[73] Assignee: PPG Industries, Inc., Pittsburgh, Pa.
[22] Filed: Dec. 13, 1973
[21] Appl. No.: 424,592

[52] U.S. Cl. ............... 214/6 D; 214/6 S; 271/224; 214/152
[51] Int. Cl.² ........................................ B65G 57/11
[58] Field of Search ................... 214/6 D, 6 S, 152; 271/221, 222, 223, 224

[56] References Cited
UNITED STATES PATENTS

| | | | |
|---|---|---|---|
| 1,750,396 | 3/1930 | Evans et al. | 214/6 D X |
| 2,585,076 | 2/1952 | Bandura et al. | 214/6 D |
| 2,626,800 | 1/1953 | Martin | 271/224 X |
| 2,761,682 | 9/1956 | Buccicone | 271/224 |
| 2,918,852 | 12/1959 | Buccicone | 214/6 S X |
| 3,022,999 | 2/1962 | Mead | 271/224 |
| 3,358,993 | 12/1967 | Lytle | 271/224 |
| 3,480,160 | 11/1969 | Barradell-Smith et al. | 271/195 X |

Primary Examiner—Robert J. Spar
Assistant Examiner—Leslie J. Paperner
Attorney, Agent, or Firm—Donald Carl Lepiane

[57] ABSTRACT

Disclosed is a lead edge stop device for preventing trail corner chipping of sheets, e.g. glass sheets, as the sheets are stacked on a receiving surface. The sheets to be stacked are released from a conveyor facilities and move along a trajectory path toward the receiving surface into engagement with a lead edge stop device.

The improved lead edge stop device of this invention includes a rigid member having a resilient surface. The member is mounted transverse to the trajectory path and biased toward the trajectory path. The resilient surface is inclined downward away from the trajectory path and extends over a portion of the receiving surface.

7 Claims, 5 Drawing Figures

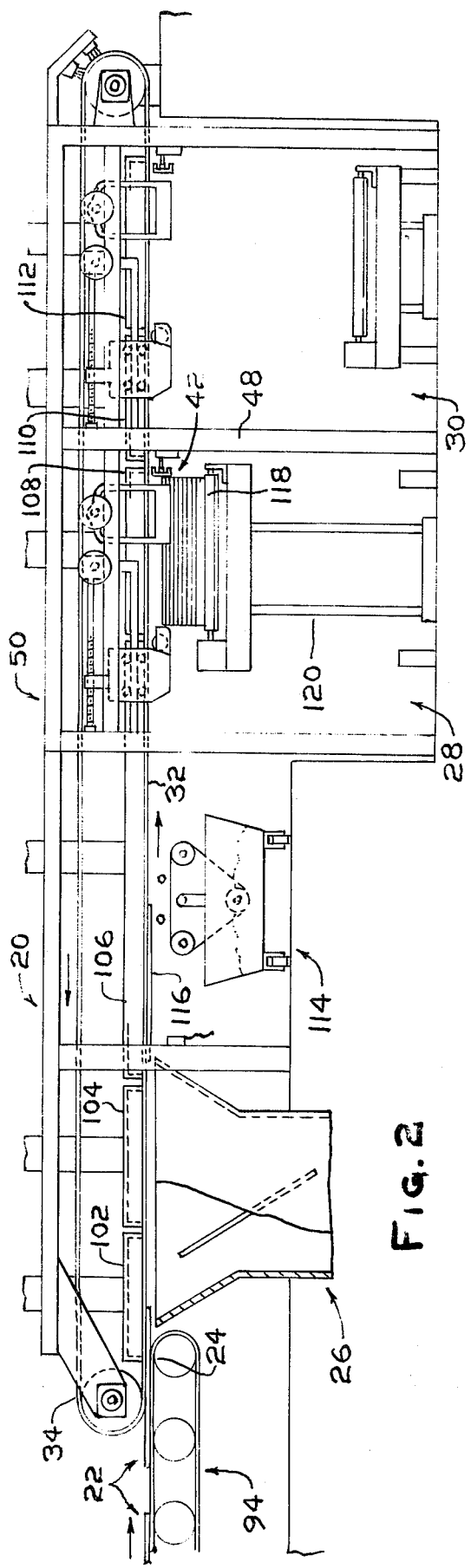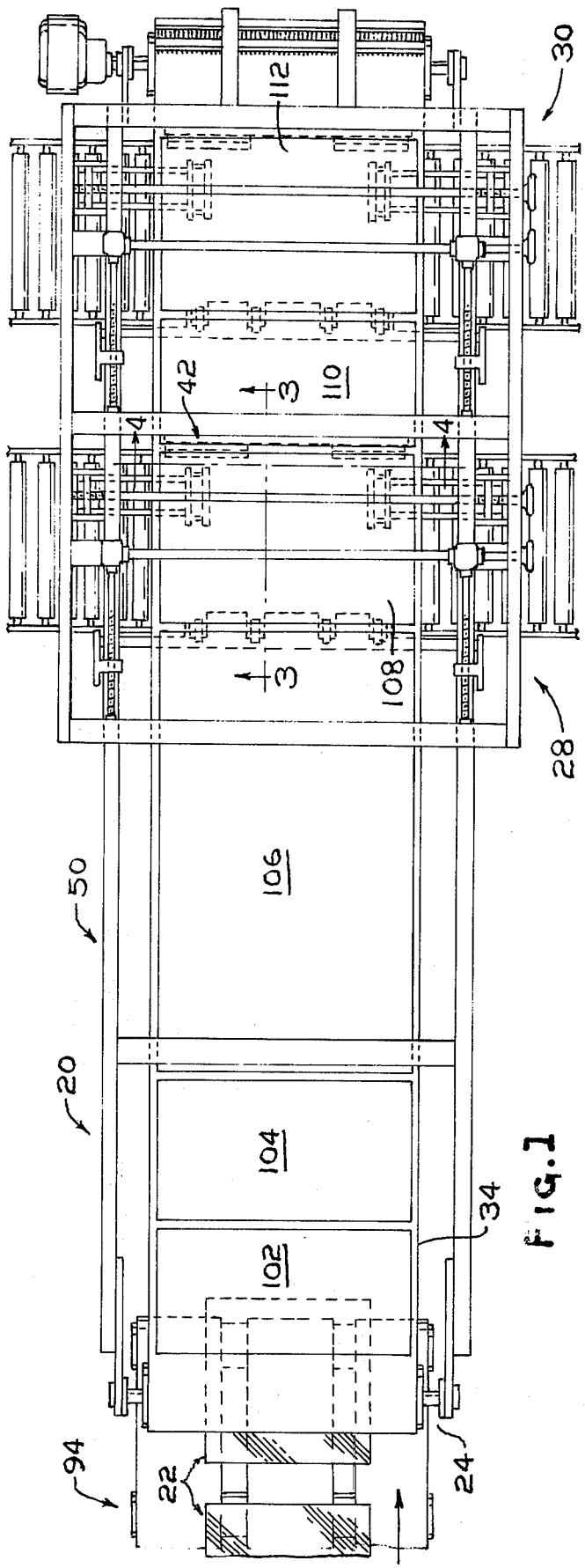

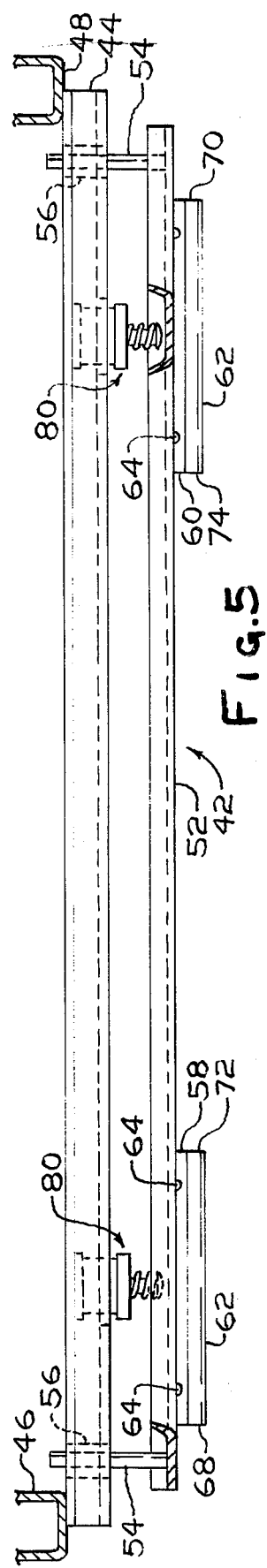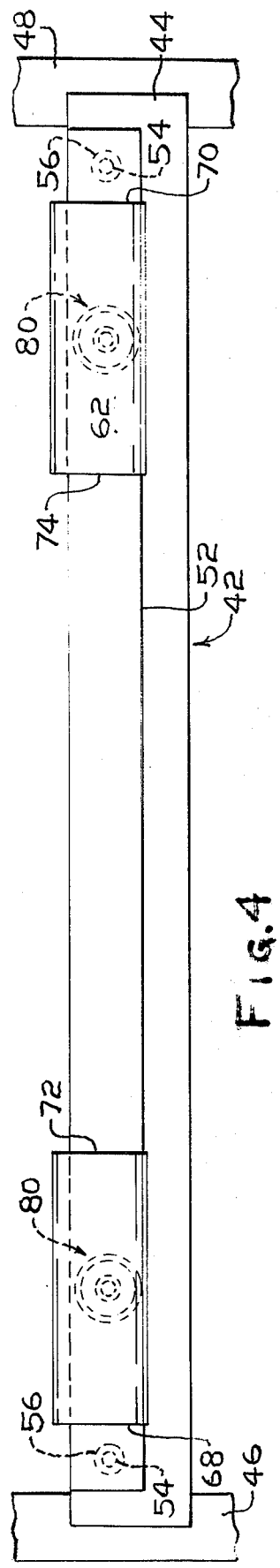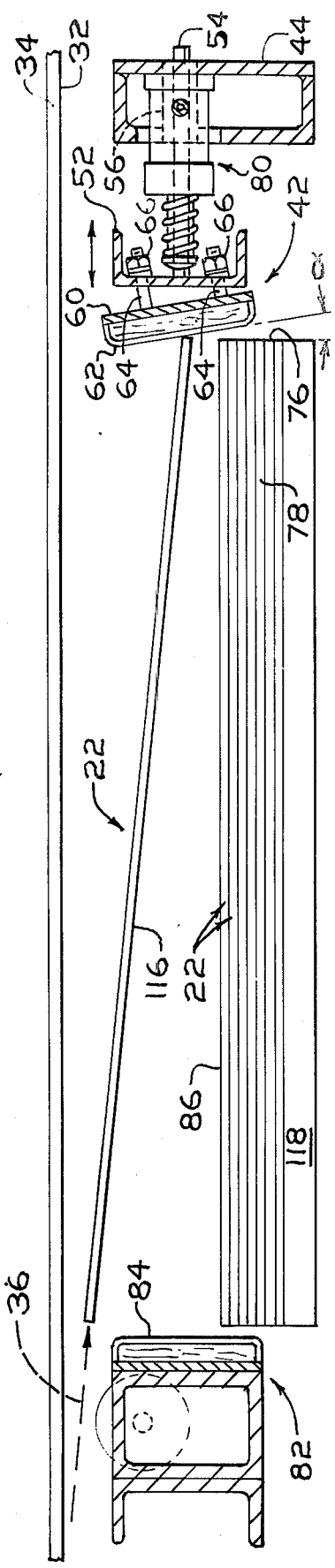

LEAD EDGE STOP DEVICE

RELATED APPLICATIONS

The lead edge stop device of this invention may be used with the stacking apparatus disclosed in U.S. patent application Ser. No. 424,507 filed even date in the name of D. A. Bollinger, W. P. Cathers and H. S. Koontz, and entitled "Apparatus For Stacking Sheet Material." The chip blow off device disclosed in U.S. patent application Ser. No. 424,586 filed even date in the name of D. A. Bollinger and W. P. Cathers and entitled "Device for Removing Chips From A Stacking Station" may be used with the lead edge stop device of this invention. The teachings of the above-identified patent applications are hereby incorporated by reference.

BACKGROUND OF THE INVENTION

1. Field of the Invention

The present invention relates to a lead edge stop device of the type used for aligning sheet material, e.g. glass sheets, on a receiving surface.

2. Discussion of the Prior Art

At the present time, there are available apparatuses for transferring individual sheets from a first position to a second position where the individual sheets are arranged in a stack. One such transferring stacking apparatus is disclosed in U.S. Pat. No. 3,480,160.

In general, the apparatus of the above-identified patent discloses transferring sheets on the lower reach of endless perforated belt conveyor. A vacuum is applied through the belt to pick up successive individual sheets at a loading position and move them toward a stacing station located under the belt conveyor. As the sheet approaches the stacking station, the sheet is released from the belt and moves along a trajectory path toward the stacking station. Facilities are provided at the stacking station for arresting the movement of the sheet and aligning individual sheets in a stack.

Several expediencies are disclosed in the above-identified patent for aligning individual sheets in a stack. For example, the leading edge and trailing edge of the sheet are aligned in a stack on a receiving surface by providing a lead edge stop and a trail edge stop. In general, the lead edge stop is a padded member that is (1) parallel to adjacent side of the stack and in the trajectory path of the sheet, and (2) pivotally mounted and biased toward the trail edge stop. The lead edge stop arrests the motion of the sheet as it moves along the trajectory path and urges it toward the trail edge stop. The trail edge stop engages the trailing edge of the sheet as it rebounds from the lead edge and urges the sheet toward the lead edge stop.

The lead edge stop disclosed in the above-identified patent for aligning sheets in the stack has drawbacks, one of which is that the lead edge stop disclosed can cause trail corner chipping. Trail corner chipping occurs when the trailing edge of the sheet, as the sheet rebounds from the lead edge stop, hits the receiving surface and slides toward the trail edge stop instead of engaging the trail edge stop. When trail corner chipping occurs, the sheet to be stacked and the sheet previously stacked are both damaged and are not useable.

SUMMARY OF THE INVENTION

This invention relates to an improvement in a method of stacking sheets on a receiving surface to eliminate trail corner chipping. Generally, the prior art method included moving the sheet along a trajectory path toward the receiving surface to move leading edge of the sheet into engagement with a first rebounding facilities positioned adjacent a first side of the receiving surface. The sheet is rebounded in a first direction over the receiving surface and opposite to the direction of the trajectory path to move the trailing edge into engagement with a second rebounding facilities. The sheet rebounds in a second direction opposite to the first direction into engagement with the first rebounding facilities as the distance between the sheet and the receiving surface decreases.

The improvement includes the step of initially engaging the leading edge of the sheet by the first rebounding facilities wherein the leading edge of the sheet is at a position spaced above the receiving surface and from the first side of the receiving surface.

The invention also relates to a device for carrying out the improved method of the invention.

BRIEF DESCRIPTION OF THE DRAWING

FIG. 1 is a plan view of a stacking apparatus having portions removed for purposes of clarity incorporating the features of this invention;

FIG. 2 is a side view of the apparatus of FIG. 1;

FIG. 3 is a view of a stacking station taken along lines 3—3 of FIG. 1 showing a lead edge stop device embodying principles of this invention to prevent trail corner chipping;

FIG. 4 is a front view of lead edge stop device of this invention taken along lines 4—4 of FIG. 1; and FIG. 5 is a plan view of FIG. 4 having portions removed for purposes of clarity.

DESCRIPTION OF THE INVENTION

In general, this invention relates to a lead edge stop device that prevents trail corner chipping of sheets as the sheets are individually stacked on a receiving surface. Normally, individual sheets of glass are transferred by conveying facilities from a first position, e.g. a load position, toward a second position, e.g. stacking station. The sheet is released from the conveying facilities to move along a trajectory path toward the stacking station. At the stacking station, there is provided a lead edge stop device and a trail edge stop device positioned on opposed sides of a receiving surface. The lead edge stop device and trail edge stop device cooperate to align the sheet on the receiving surface.

The discussion of this invention will be directed to align individual glass sheets on a receiving surface. However, as will be appreciated, the invention is not limited thereto. More particularly, sheets of any rigid material such as plastic or metal may be stacked on a receiving surface using the device of this invention. Further, the lead edge stop device of this invention will be discussed using the stacking apparatus disclosed in U.S. patent application Ser. No. 424,507 filed even date in the names of D. A. Bollinger, W. P. Cathers and H. S. Koontz and entitled "Apparatus For Stacking Sheet Material." However, as will become apparent, the lead edge stop device of this invention can be used with any of the well known sheet stacking apparatuses.

Shown in FIGS. 1 and 2, is apparatus 20 of the above-identified U.S. patent application Ser. No. 424,507 filed even date in the names of D. A. Bollinger, W. P. Cathers and H. S. Koontz for transferring individual sheets 22 from a loading position 24 to a selected one of several stations, e.g. a cullet bin 26, a first stacking station 28, or a second stacking station 30.

As the sheet approaches either the first or second stacking station 28 and 30 respectively, facilities are actuated as described in the above mentioned U.S. patent application Ser. No. 424,507 filed even date in the names of D. A. Bollinger, W. P. Cathers and H. S. Koontz for releasing the sheet from lower reach 32 of belt 34 of the conveyor 20 and move the sheet along a trajectory path 36 toward a stacking station into engagement with a lead edge stop device 42 emboding principle of this invention (see FIG. 3).

Referring now to FIGS. 3, 4 and 5, the discussion will be directed to lead edge stop device 42 of this invention. The lead edge stop device 42 includes a cross member 44 securely mounted at its ends to posts 46 and 48 of superstructure 50 which supports the belt 34 (see also FIGS. 1 and 2). A channel member 52 is slideably attached to the cross member 44 by a pair of shafts 54 mounted at opposed ends to the channel member 52 and passing through bushings 56 mounted on the cross member 44 (shown better in FIG. 5). A pair of rigid members 58 and 60 each covered with a resilient pad 62 are provided at their ends with a pair of threaded shafts 64 which pass through nuts 66 captured on the channel member 52 (shown better in FIG. 3).

With specific reference to FIGS. 4 and 5, the distance between side 68 of the rigid member 58 and side 70 of the rigid member 60 is at least equal to the largest length of the sheet to be stacked; for example, 80 inches. The distance between sides 72 and 74 of the rigid members 58 and 60 respectively, is less than the smallest length of the sheet to be stacked, e.g. 40 inches. As can be appreciated, instead of using the two rigid members 58 and 60, a solid member having a resilient covering may be used.

The resilient pads 62 which are engaged by the leading edge of the sheet 22 (see FIG. 3) prevent the leading edge from being damaged. The pads may be made of ⅛ inch thick covering of gum rubber over a ½ inch thick layer foam shock absorbing rubber or any equivalence thereof, e.g. Ensolite.

With reference to FIG. 3, the surface of the pads 62 and side 76 of stack 78 of sheets 22 subtend an oblique angle $\alpha$. This feature of the invention will be discussed in more detail below.

With reference to FIGS. 3, 4 and 5, there is shown a pair of shock absorbers 80 mounted in spaced relationship on the rigid member 44 and act on the channel member 52. As the leading edge of the sheet 22 engages the pads 62, the rigid members 58 and 60 and the channel member 52 are urged toward the cross member 44 against the bias of the shock absorbers 80. The shock absorbers 80 absorb the force of the moving sheet. As the force of the moving sheet is absorbed, the sheet decelerate to zero acceleration. The shock absorbers 80 thereafter urge the channel member 52 and rigid members 58 and 60 away from the cross member 44 to rebound the sheet toward a trail edge stop device 82. The trailing edge of the sheet moves into engagement with the trail edge stop device 82.

The trail edge stop device 82 as shown in FIG. 3 is a trail edge stop of the above mentioned U.S. patent application filed even date in the names of D. A. Bollinger, W. P. Cathers and H. S. Koontz. However, as can be appreciated, the invention is not limited to a specific trail edge stop device. For example, the trail edge stop device may be a curtain of air.

Normally, the trail edge stop device is mounted for movement toward and away from the leading edge stop 50 device in any conventional manner to accommodate varying widths of sheets to be stacked. One such manner of mounting the trail edge stop device 82 for movement is disclosed in the above mentioned U.S. patent application Ser. No. 424,507 filed even date in the names of D. A. Bollinger, W. P. Cathers and H. S. Koontz. However, as can be appreciated, the trail edge stop device 82 may be moveably mounted in any conventional manner to accommodate varying widths of sheets to be stacked.

With reference to FIG. 3, the discussion will now be directed to a sheet of glass 22 released from the lower reach 32 of the belt 34. The sheet as it is released from the belt 34 moves along the trajectory path 36. The leading edge of the sheet engages the pads 62 of the lead edge stop device 42 and the sheet rebounds therefrom toward pads 84 of the trail edge stop device 82. Simultaneously, the trailing edge of the sheet drops down toward receiving surface 86 of the stack 78, and the trailing edge of the sheet moves into engagement with the pads 84 of the trail edge stop device 82. The sheet rebounds from the trail edge stop device 82 toward the leading edge stop device 42 and rebounds therefrom. As the sheet reciprocates between the lead edge stop device 42 and the trail edge stop device 82, the sheet is lowered by gravity onto the receiving surface 86 on a cushion of air generated between the bottom surface 116 of the sheet 22 and the receiving surface 86.

The distance between (1) the side 76 of the stack 78 and the pads 62 and (2) the side 90 of the stack 78 and the pads 84 of the lead edge stop device 42 and the trail edge stop device 82 respectively, at the receiving surface 86 is normally one-sixteenth of an inch. Stated another way, the distance between the lead edge stop device 42 and the trail edge stop device 82 at the receiving surface is about one-eighth inch greater than the length of the sheets to be stacked. If irregularities in the stack are acceptable, the distance may be increased.

The surface of the pads 62 of the lead edge stop 42 at the side 76 of the stack 78 subtend an angle $\alpha$ which is greater than 0° and normally less than 15° (see FIG. 3). This prevents trail corner chipping. More particularly, if the surface of the pads of the lead edge stop device are parallel to the adjacent side of the stack, trail edge corner chipping occurs. This is because when the leading edge of the sheet engages the lead edge stop device, the sheet urges the lead edge stop device away from the adjacent side of the stack. The trailing edge of the sheet drops down toward the receiving surface of the stack. When the sheet rebounds toward the lead edge stop device, the trailing edge of the sheet is on the receiving surface and slides along the receiving surface into engagement with the trail edge stop device. The sliding of the trail edge along the receiving surface chips the trailing edge and is referred to as trail corner chipping.

Inclining the surface of the pads of lead edge stop device away from the trajectory such that a portion of the pads are above the receiving surface of the stack eliminates trail corner chipping. This is because the distance the sheet has to move away from the lead edge stop device to engage the trail edge stop device is reduced and the trailing edge of the sheet is moved into engagement with the trail edge stop device and not the receiving surface.

The angle α (see FIG. 3) is a function of (1) the distance the lead edge stop device is moved away from the adjacent side of the stack by the falling sheet as it moves along its trajectory path; (2) the distance between the lead edge stop device and the trail edge stop device at the receiving surface of the stack; and (3) the distance from the receiving surface that the lead edge stop is engaged. As can be appreciated, the distance the lead edge stop is moved away is a function of the force of the sheet, e.g. weight of the sheet and acceleration.

For (1) a given distance between the trail edge stop device and the lead edge stop device at the receiving surface; and (2) a given distance from the receiving surface that the lead edge stop device is engaged, the angle α increases as the distance of the lead edge stop device is moved away from the adjacent side of the stack by the falling sheet. For (1) a given distance that the lead edge stop device is moved away from the adjacent side of the stack by the sheet and (2) a given distance from the receiving surface that the sheet engages the lead edge stop device, the angle α increases as the distance between the lead edge stop device and trail edge stop device at the receiving surface increases. For (1) a given distance between the lead edge stop device and the trail edge stop device at the receiving surface and (2) a given distance the lead edge stop is moved away from the adjacent side of the stack by the falling sheet, the angle α decreases as the distance from the receiving surface that the lead edge stop is engaged by the falling sheet decreases. It is recommended that the shock absorbers such as the adjustable type shock absorber sold by Ace Control, Inc., be adjusted for one-fourth inch to one-half inch movement.

It has been found that an angle of about 5° prevents trail corner chipping when (1) the distance between the lead edge stop device and the trail edge stop device at the receiving surface are each one-sixteenth inch from their respective adjacent side of the stack; (2) the lead edge stop device is moved one-fourth inch to one-half inch away from the adjacent side of the stack by the moving sheet; and (3) the sheet engages the lead edge device about 2 inches from the receiving surface.

With reference to FIG. 3, the pads 62 of the lead edge stop device 42 are normally about 1 inch below the lower reach 32 to the belt 34 and about 2 inches below the receiving surface 86 of the stack 78. The pads 84 of the trail edge stop device 82 is about 1½ inches to 2 inches below the lower reach 32 of the belt 34 and about 2 inches below the receiving surface 86. It is recommended that the falling sheet engage the lead edge stop device about 2 inches from the receiving surface.

The receiving surface is normally 3 inches to 4 inches below the lower reach 32 of the belt 34. The distance from the lower reach of the belt and the receiving surface is maintained constant by loading the sheets on a platen 118 mounted on an elevator mechanism 120 (see FIG. 2) which is incrementally displaced to move the platen away from the lower reach of the belt after a sheet is deposited on the receiving surface. Such an arrangement is disclosed in the above mentioned U.S. patent application 424,507 filed even date in the names of D. A. Bollinger, W. P. Cathers and H. S. Koontz.

DETAILED DESCRIPTION OF THE INVENTION

The lead edge stop of the invention will now be discussed for stacking sheets of glass 40 inches × 80 inches × 3/32 inches thick at either one of two stacking stations. The stacking apparatus is that disclosed in the above mentioned U.S. patent application Ser. No. 424,507 filed even date in the names of D. A. Bollinger. W. P. Cathers and H. S. Koontz.

With reference to FIGS. 1 and 2, sheets of glass 22 are moved along a horizontal conveyor 94 and programmed for either a cullet bin 26, a first stacking station 28 or a second stacking station 30. The sheets continue to move along the conveyor 94 into a load position 24. At the load position, the sheets of glass are successively moved into surface engagement with lower reach 32 of the conveying belt 34. Vacuum is applied through vacuum chambers 102, 104, 106, 108, 110 or 112 to urge the sheet against the lower reach of the belt as the sheet is conveyed toward the cullet bin or the stacking stations. If the sheet is programmed for the cullet bin, the sheet is released at a predetermined point along the path of the belt 34 by closing the vacuum to vacuum chamber 104 to release the sheet from the lower reach of the belt. If the sheet is programmed for either of the stacking stations 28 or 30, the sheet moves past the cullet bin and over a powder interleaver station 114 where interleaver material is applied to bottom surface 116 of the sheet. The sheet moves from the powder interleaver station toward the first or second stacking stations 28 or 30 respectively. If the sheet is programmed for the first stacking station, the sheet is released as it moves under vacuum chamber 108. If the sheet is programmed for the second stacking station, the sheet is released at vacuum chamber 112.

With reference to FIG. 3, the sheet as it is released moves along the trajectory path toward a lead edge stop device 42 of this invention.

A platen 118 is provided for receiving the sheets. The surface of the platen, i.e. receiving surface 86, is spaced by way of elevator mechanism 120 approximately 4 inches from the lower reach 32 of the belt 34 (shown in FIG. 2).

Pads 62 of the lead edge stop device 42 are spaced about one-sixteenth inch from the side 76 of the receiving surface 86. The pads 62 and the side 76 of the receiving surface 86 subtend an angle α of about 5° as shown in FIG. 3. Pads 84 of the trail edge stop device 82 are spaced about one-sixteenth inch away from side 90 of the receiving surface. The top of the pads 62 of the lead stop device 42 are about 1 inch away from the lower reach 32 of the belt 34 and the top of the pads 84 of the trail edge stop device 82 is about 2 inches away from the lower reach 32 of the belt 34. The pads 62 and 84 extend about 3 inches and 2 inches respectively, below the receiving surface 86.

The sheet of glass is programmed to the released from the low reach 32 of the belt 34 so that the sheet has a trajectory path 36 such that the leading edge of the sheet engages the pads 62 of the lead edge stop device 42 about 2 inches above the receiving surface in a manner disclosed in the above-mentioned U.S. patent application Ser. No. 424,507 filed even date in the names of D. A. Bollinger, W. P. Cathers, and H. S. Koontz.

As the sheet moves toward either one of the first or second stacking stations, the sheet is released from the lower reach of the belt and moves along the trajectory path into engagement with the pads of the lead edge stop device and urges channel member 52 through about a ½ inch movement against the shock absorbers 80. The shock absorbers decelerate the sheets to zero acceleration and then urge the channel member 52 toward the trail edge stop device to move the trailing edge of the sheet toward the trailing edge device 82. As the sheet rebounds from the lead edge device, the trailing edge of the sheet drops by gravity below the top of the pads of the trail edge stop device and the trailing edge of the sheet is moved into engagement with pads of the trail edge device. The sheet rebounds from the trail edge stop device 82 toward the lead edge stop device 42. The sheet reciprocates between the lead edge stop device and the trail edge stop device as the sheet drops on an air cushion onto the receiving surface. The air cushion is generated by the falling sheet.

Using the lead edge stop device of this invention, trail corner chipping can be eliminated thereby preventing damage to the falling sheet and to the previously stacked sheet.

Although the discussion was directed to the stacking apparatus as disclosed in U.S. patent application Ser. No. 424,507 filed even date, in the names of D. A. Bollinger, W. P. Cathers and H. S. Koontz, it is to be understood that the method and device of this invention for preventing trail corner chipping may be used with any of the stacking apparatuses of the prior art.

What is claimed is:

1. In a method of stacking a sheet on a receiving surface lying in a generally horizontal plane, wherein the method includes the step of conveying the sheet along a predetermined path by conveying means toward the receiving surface; releasing the sheet from the conveying means; moving the sheet free of support along a trajectory path toward the receiving surface to move the leading edge of the sheet into engagement with a first rebounding means positioned adjacent a first side of the receiving surface; rebounding the sheet in a first direction over the receiving surface and opposite to the direction of the trajectory path to move the trailing edge of the sheet into engagement with a second rebounding means; rebounding the sheet in a second direction opposite to the first direction to move the leading edge into engagement with the first rebounding means as the distance between the receiving surface and the sheet decreases, the improvement comprising the step of:

initially engaging the leading edge of the sheet, as it moves along the trajectory path, by the first rebounding means when the leading edge of the sheet is at a position spaced above the receiving surface and when the leading edge is between the first side of the receiving surface and the second rebounding means.

2. The improved method as set forth in claim 1 further including the step of sequentially engaging the leading edge of the sheet with the first rebound means at positions spaced above the receiving surface and between the first side of the receiving surface and the second rebounding means as the distance between the leading edge of the sheet and the first side of the receiving surface decreases for each subsequent engagement of the leading edge of the sheet with the first rebounding means.

3. In an apparatus for stacking a sheet onto a receiving surface lying in a generally horizontal plane wherein the stacking apparatus is of the type having means for conveying the sheet along a predetermined path toward the receiving surface; means for releasing the sheet from the conveyor to move the sheet free of support along the trajectory path toward the receiving surface; a first means mounted adjacent a side of the receiving surface and transverse to the trajectory path for engaging the leading edge of the sheet as the sheet moves along the trajectory path and for urging the sheet in a first direction over the receiving surface wherein the first direction is opposite to the direction of the trajectory path; a second means mounted opposite to the first engaging and urging means and adjacent to the opposite side of the receiving surface for engaging the trailing edge of the sheet as the sheet moves in the first direction and for urging the sheet in a second direction opposite to the first direction wherein the distance between the receiving surface and the sheet decreases, the improvement comprising:

means for mounting the first engaging and urging means such that (1) the engaging surface of the first engaging and urging means and a plane normal to the receiving surface subtend an oblique angle such that the engaging surface is inclined over a portion of the receiving surface and toward the second engaging and urging means and (2) the engaging surface of the first engaging means extends from the trajectory path downward to the receiving surface.

4. The improved apparatus as set forth in claim 3 wherein the first engaging and urging means comprises:

the engaging surface comprises resilient means for preventing damage to the leading edge of the sheet;
a rigid member;
means for mounting said resilient means on said rigid member such that (1) the surface of the resilient means and a plane normal to the receiving surface subtend the oblique angle and (2) the surface of said resilient means extends from the trajectory path downward below the receiving surface; and
biasing means acting on said rigid member to absorb the force of the sheet as the leading edge of the sheet engages the resilient means and to urge the sheet in the second direction to move the trailing edge of the sheet toward the second engaging and urging means.

5. The improved apparatus as set forth in claim 4 wherein said biasing means includes shock absorbing means.

6. The improved apparatus as set forth in claim 4 wherein the oblique angle is greater than 0° but less than 15°.

7. The improved apparatus as set forth in claim 6 wherein the oblique angle is 5°.

* * * * *

UNITED STATES PATENT OFFICE
CERTIFICATE OF CORRECTION

PATENT NO. : 3,907,128
DATED : September 23, 1975
INVENTOR(S) : William P. Cathers It is certified that error appears in the above—identified patent and that said Letters Patent are hereby corrected as shown below:

Claim 1, line 3 "step" should be --steps--.

Signed and Sealed this sixteenth Day of December 1975

[SEAL]

Attest:

RUTH C. MASON
Attesting Officer

C. MARSHALL DANN
Commissioner of Patents and Trademarks